(12) United States Patent
Yamamoto et al.

(10) Patent No.: US 7,325,889 B2
(45) Date of Patent: Feb. 5, 2008

(54) TRACK HAVING ROTATABLE BUSHING AND LINK FOR THE SAME

(75) Inventors: Teiji Yamamoto, Kadoma (JP); Kazuo Maeda, Hirakata (JP)

(73) Assignee: Komatsu Ltd (JP)

( * ) Notice: Subject to any disclaimer, the term of this patent is extended or adjusted under 35 U.S.C. 154(b) by 72 days.

(21) Appl. No.: 10/727,573

(22) Filed: Dec. 5, 2003

(65) Prior Publication Data

US 2005/0040708 A1   Feb. 24, 2005

(30) Foreign Application Priority Data

Jan. 29, 2003   (JP)   ............................ P2003-019879
Nov. 28, 2003   (JP)   ............................ P2003-399218

(51) Int. Cl.
  *B62D 55/21*   (2006.01)
(52) U.S. Cl. ........................................ 305/201; 305/202
(58) Field of Classification Search ............... 305/59, 305/185, 196, 198, 200, 201, 202, 118, 103, 305/104, 105, 106
See application file for complete search history.

(56) References Cited

U.S. PATENT DOCUMENTS

| 3,595,572 | A | * | 7/1971 | Granda ........................ 277/381 |
| 3,784,262 | A | * | 1/1974 | Kaizaki et al. ............. 305/104 |
| 4,288,172 | A | * | 9/1981 | Livesay et al. ............. 403/317 |
| 5,172,965 | A | | 12/1992 | Taft |
| 5,183,318 | A | | 2/1993 | Taft et al. |
| 5,829,849 | A | * | 11/1998 | Lawson ........................ 305/193 |
| 6,322,173 | B1 | * | 11/2001 | Maguire et al. ............. 305/185 |
| 6,371,577 | B1 | | 4/2002 | Hasselbusch et al. |
| 6,564,539 | B2 | * | 5/2003 | Bedford et al. ................ 59/7 |
| 6,783,196 | B2 | * | 8/2004 | Maguire et al. ............. 305/186 |
| 2002/0145336 | A1 | * | 10/2002 | Bottom et al. ............. 305/202 |
| 2003/0141760 | A1 | | 7/2003 | Yamamoto |
| 2006/0181151 | A1 | * | 8/2006 | Wodrich et al. ............. 305/201 |

FOREIGN PATENT DOCUMENTS

| DE | 4410388 A1 | 9/1995 |
| JP | Y-54-4206 | 2/1979 |
| JP | 58-67572 | * 4/1983 |

(Continued)

OTHER PUBLICATIONS

CNPO Office Action with English translation, App. No. 200410002423.3, Feb. 16, 2007 (10 pages) Translation considered only; 3 pages.

*Primary Examiner*—Russell D. Stormer
(74) *Attorney, Agent, or Firm*—Rader Fishman & Grauer PLLC; Ronald P. Kananen

(57) ABSTRACT

In a track with a rotatable bushing which is brought into engagement with a sprocket of a track-type vehicle, it is intended that strength is enhanced rationally by link functionality sharing and by combination of such assigned functional tasks for achieving further improvements in rotatable bushing function. To this end, a track link comprises a combination of an external link and an internal link; a coupler pin hole is provided through the external link; a bushing hole is provided through the internal link, and the thickness dimension of a bushing hole formation part of the internal link is made greater than that of a coupler pin formation part of the external link.

9 Claims, 7 Drawing Sheets

FOREIGN PATENT DOCUMENTS

| | | |
|---|---|---|
| JP | A-6-504747 | 6/1994 |
| JP | A-2001-347972 | 12/2001 |
| JP | A-2001-347973 | 12/2001 |
| JP | A-2001-347974 | 12/2001 |
| JP | A-2003-220983 | 8/2003 |
| WO | WO 93/11020 | 6/1993 |

* cited by examiner (a) PRIOR ART (b) PRIOR ART

TRACK HAVING ROTATABLE BUSHING AND LINK FOR THE SAME

TECHNICAL FIELD

The present invention relates to a track and its link for track-type work machines. More particularly, this invention is directed to a track with a rotatable bushing and to a link for such a track with a rotatable bushing for the achievement of improvement in the strength of a connection part comprising a combination of an internal link and an external link.

BACKGROUND ART

A track on a under carriage of a track-type work machine (such as a hydraulic excavator, bulldozer et cetera) conventionally comprises endlessly-coupled track links and track shoes mounted on the respective track links. The track is passed around a sprocket and idler which are supported on the vehicle frame and disposed at required intervals. Engaged with a sprocket, each track link is driven. The track is supported by track rollers and carrier rollers disposed between the sprocket and idler in the vehicle frame. The track-type work machine travels by such arrangement.

Referring to FIGS. 7(a) and 7(b), a track link of the track of the above-described type is a single link (a link assembly 70) formed by interconnecting offset type link pieces 71,71 which are formed symmetrically relative to the width direction by a track bushing 72, with a space left therebetween. Such link assemblies 70 are connected together sequentially by coupler pins 73 inserted into associated track bushings 72. A track shoe 75 is fixedly fastened to an end surface corresponding to the ground contact side of each link assembly 70 by a bolt and nut. More specifically, the bolt is passed through a bolt insertion hole 74 extending in the direction orthogonal to the axial direction of the coupler pin 73 at an intermediate position of the link piece 71. In the track 60, the track bushing 72 situated at a connecting portion of adjoining track links (adjoining link assemblies 70) engages with the teeth of a sprocket (not shown), and power supplied from the sprocket is transmitted, via the track bushing 72, to the coupler pin 73, to the pair of link pieces 71, 71, and then to the track shoe 75.

In the track 60 of the above-described type, the track bushing 72 that intermeshes with the teeth of the sprocket is fixed to the link pieces 71, 71. The track bushing 72 functions not only as a bearing member constituting a turning pair in the link assembly 70 but also as a power transferring member capable of direct transmission of power from the sprocket. The external peripheral surface of the track bushing 72 receives a surface pressure caused by slide contact with the tooth surface of the sprocket and undergoes relative slipping occurring when engaged with the sprocket. However, since both ends of the track bushing 72 are fixed to the pair of link pieces 71, 71, the external peripheral surface of the track bushing 72 locally receives a surface pressure and relative slipping. Accordingly, in the conventional track 60, the track bushing 72 wears off soon, and the frequency of replacement of the track bushing 72 is high, thereby producing the problem that running costs become expensive.

There are techniques known in the art (JP, 06-504747, B(1994) (published Japanese translations of PCT international publication for patent applications) and Japanese Utility Model Kokoku Publication No. (1979)4206), which are capable of providing solutions to the aforesaid problems with the conventional techniques. In such techniques, a track bushing is divided into three sub-bushings. Of these sub-bushings, one situated in the middle and brought into engagement with the teeth of a sprocket is formed rotatably. This construction allows the track bushing to engage smoothly with the teeth of the sprocket, and relative slipping at the time of engagement is reduced, thereby preventing the bushing from wearing off soon. In addition to these prior art techniques, there is another technique disclosed in the Applicant's previous patent application (Japanese Patent Application No. 2002-22803).

In the track link according to the aforesaid 06-504747 technique, the track bushing is divided into three sub-bushings. Of these three sub-bushings, the intermediate sub-bushing is made rotatable on a coupler pin. As a result of such arrangement, the other sub-bushings situated on both sides of the intermediate sub-bushing are press fitted into the inside of mount holes provided in the link pieces, and serve as bearing bushings for the coupler pins. In this construction assembled as a link assembly, a pair of link pieces and a coupler pin are merely rigidly joined, so that there occurs a high stress between the pin mount part and a track shoe mount part, thereby producing the problem that rigidity falls considerably in comparison with conventional tracks without rotatable bushings.

Additionally, in the link assembly connection part, for the provision of a seal member for providing sealing between a bushing end and a coupler pin fixing side link piece, such a structure that the sealing member is fitted into a coupler pin side of the link is employed. This not only makes machining work troublesome but also produces the problem that assembling work becomes complicated. Furthermore, in the aforesaid (1979)4206 technique, there occurs insufficiency in strength on the coupler pin side of the link piece. Therefore, the (1979)4206 technique suffers the same problem as does the 06-504747 technique.

The present invention was made with a view to providing solutions to the problems with the prior art techniques. Accordingly, a general object of the present invention is to provide a track with a rotatable bushing and a link suitable for such a track with a rotatable bushing capable of reasonably enhancing strength by link functionality sharing and by combination of such assigned functional tasks, and capable of achieving further improvements in rotatable bushing function.

SUMMARY OF THE INVENTION

In order to achieve the aforesaid object, the present invention provides a track with a rotatable bushing. More specifically, the track with the rotatable bushing of the present invention is a track with a rotatable bushing for use in a track-type vehicle, and is characterized in that: a track link comprises a combination of an external link and an internal link; a coupler pin hole is provided through the external link; a bushing hole is provided through the internal link; and a bushing hole part of the internal link is formed greater in thickness dimension than a coupler pin hole part of the external link.

In accordance with the present invention, a track link is composed of a combination of an internal link with an external link. With respect to the external link to which a coupler pin is attached, the thickness of a bushing hole portion of the internal link into which a bushing to be externally interfitted onto the coupler pin is incorporated is made greater than the thickness of a coupler pin hole portion of the external link. As a result of such arrangement, the strength on the bushing incorporated side is enhanced, and stress acting on both the internal and external links becomes balanced, and rigidity deficiency in the bushing side link (the internal link) is eliminated. It becomes possible to obtain a balanced track link and the strength of track is enhanced.

In the present invention, preferably a boss part having a gentle-slope upheaval portion around the bushing hole is provided on an outer surface area of the internal link. As a result of such arrangement, the thickness of an insertion hole part for the bushing serving as a bearing member which is externally interfitted onto the coupler pin is increased for establishing a balance with the strength at a coupler pin press fit portion in the assembly state, for achieving improvement in the track link strength. Besides, it is possible to finish an area extending from the tread to the bushing hole part into a smooth surface in a link molding step, thereby facilitating the process of manufacture and preventing the occurrence of internal deformation during the molding process.

In the above-described arrangement, preferably an inner surface side circumferential area of the coupler pin hole of the external link is formed into a concave surface corresponding to an outer shape of the boss part of the internal link. As the result of this, interference with the internal link at the connecting part is eliminated, thereby making it possible to secure a required interfit space for the interfitting of the coupler pin to the external link. The effect of smoothly transmitting power is obtained. Additionally, also during the link molding process, the occurrence of internal deformation is prevented as is in the internal link.

Furthermore, in the present invention, preferably an outer surface side circumferential area of the coupler pin hole of the external link is formed into a bulging-out shape. This arrangement makes it possible to increase the width dimension of track link. Accordingly, while securing the thickness of the coupler pin hole portion of the external link, the thickness of the bushing hole portion of the internal link can be increased. Additionally, also during the link molding process, the occurrence of internal deformation is prevented as is in the internal link.

Furthermore, it is advisable that the bushing hole part of the internal link is 1.1 to 2.0 times greater in thickness dimension than the coupler pin hole part of the external link. As the result of this arrangement, in comparison with the coupler pin hole formation part of the external link into which the coupler pin is directly fixedly press-fitted, it is possible to extend the length of bushing-to-hole interfitting as well as to enhance strength because the seal rings are housed inside for interfitting to the bushing serving also as a bearing member in the bushing hole formation part of the internal link. If the comparative ratio of the length (thickness) of the bushing hole formation part to that of the coupler pin hole formation part is not more than 1:1.1, the degree of stress acting on the bushing side is increased by the load acting on the bushing hole side, resulting in the drop in rigidity. On the other hand, if the aforesaid ratio exceeds 1:2.0, the strength of the internal link is improved; however, when assembled as a track link, the link width thereof increases excessively and the weight becomes excessive. This is unfavorable because the load, at the time when the vehicle is travelling, increases.

Furthermore, it is advisable that a seal ring, interposed between a fixed bushing which is interfittingly inserted into the bushing hole of the internal link and a rotatable bushing which is interposed between right and left internal links, is interfittingly disposed in the inside of the bushing hole. Additionally, it is preferable that a seal ring, interposed between a fixed bushing which is interfittingly inserted into the bushing hole of the internal link and the external link, is interfittingly disposed in the inside of the bushing hole. These arrangements offer the following advantages. That is, unlike conventional techniques, it becomes possible to establish sealing without having to provide a seal receiving part around the coupler pin hole. Workability in the manufacture is improved. Costs are reduced. Assembly is improved by disposing a seal ring in the inside of the bushing hole of the internal link. Additionally, the arrangement that the seal ring interposed between the fixed bushing and the external link is interfittingly provided in the inside of the bushing hole makes it possible to eliminate the possibility that the strength of the coupler pin hole formation part of the external link falls.

Firstly, the present invention discloses a link for a track with a rotatable bushing which is an internal link for a track with a rotatable bushing for a track-type vehicle wherein a track link comprises a combination of an external link and an internal link and wherein a bushing hole is provided through the internal link. An internal link for a track with a rotatable bushing of the present invention is characterized in that a boss part having a gentle-slope upheaval portion extending from near a tread toward a circumferential area of the bushing hole is provided on an outer surface area of the internal link.

In accordance with the above-described internal link of the present invention, it becomes possible to increase the thickness of an insertion hole part for the bushing which is externally interfittingly inserted onto the coupler pin and serves as a bearing member, for establishing a balance with respect to the strength at the coupler pin press-fit hole portion in the assembly state. As a result, the strength of track link is improved. Besides, it is possible to finish an area extending from the tread to the bushing hole part into a smooth surface in a link molding step, thereby facilitating the process of manufacture and preventing the occurrence of internal deformation during the molding process.

Secondarily, the present invention discloses a link for a track with a rotatable bushing which is an external link for a track with a rotatable bushing for a track-type vehicle in which a track link comprises a combination of an external link and an internal link and a coupler pin hole is provided through the external link. An external link for a track with a rotatable bushing of the present invention is characterized in that an inner surface side circumferential area of the coupler pin hole of the external link is formed into a concave surface corresponding to an outer shape of a boss part formed around a bushing hole of the internal link.

In accordance with the external link of the present invention, interference with the internal link at the connecting part is eliminated, thereby making it possible to secure a required interfit space for the interfitting of the coupler pin to the external link. The effect of smoothly transmitting power is obtained. Additionally, also during the link molding process, the occurrence of internal deformation is prevented as is in the internal link.

BEST MODE FOR CARRYING OUT INVENTION

Figure 1:
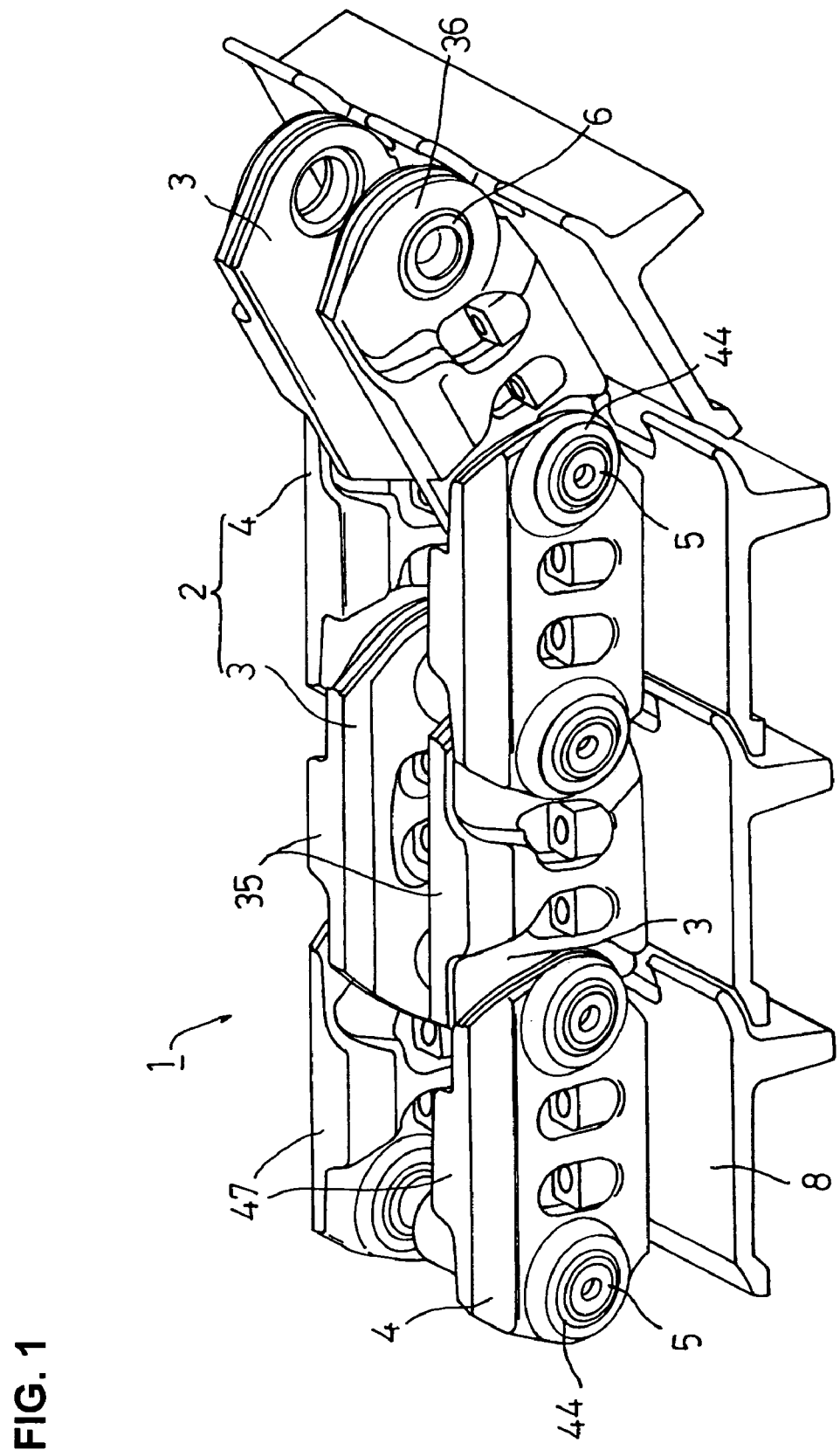
FIG. 1 is a partial perspective illustration of a track according to an embodiment of the present invention.

Hereinafter, referring to the drawings, a specific embodiment of a track with a rotatable bushing and a link for a track with a rotatable bushing according to the present invention will be described below.

Figure 2:
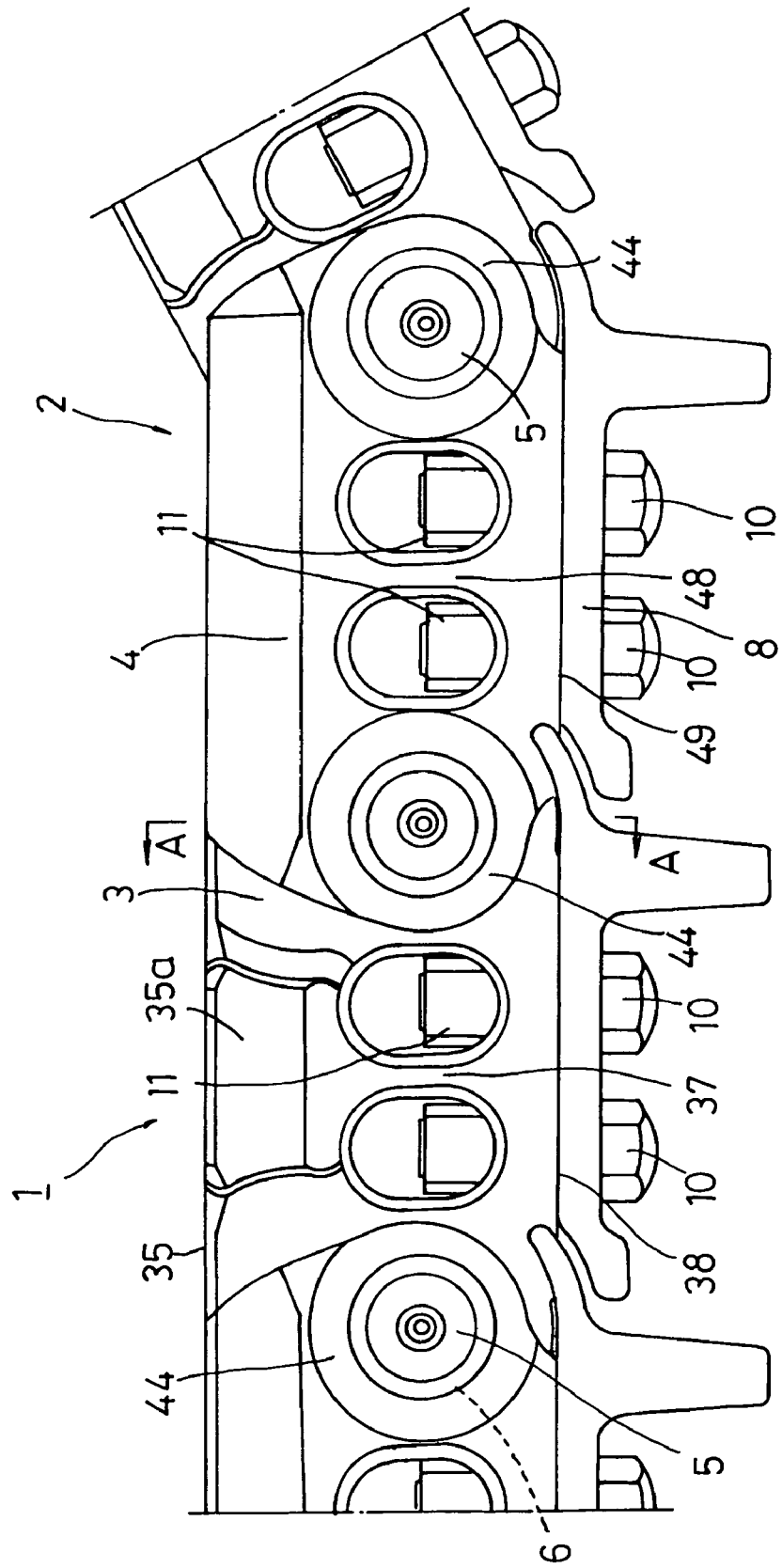
FIG. 2 is a partial front view of the track.
Figure 3:
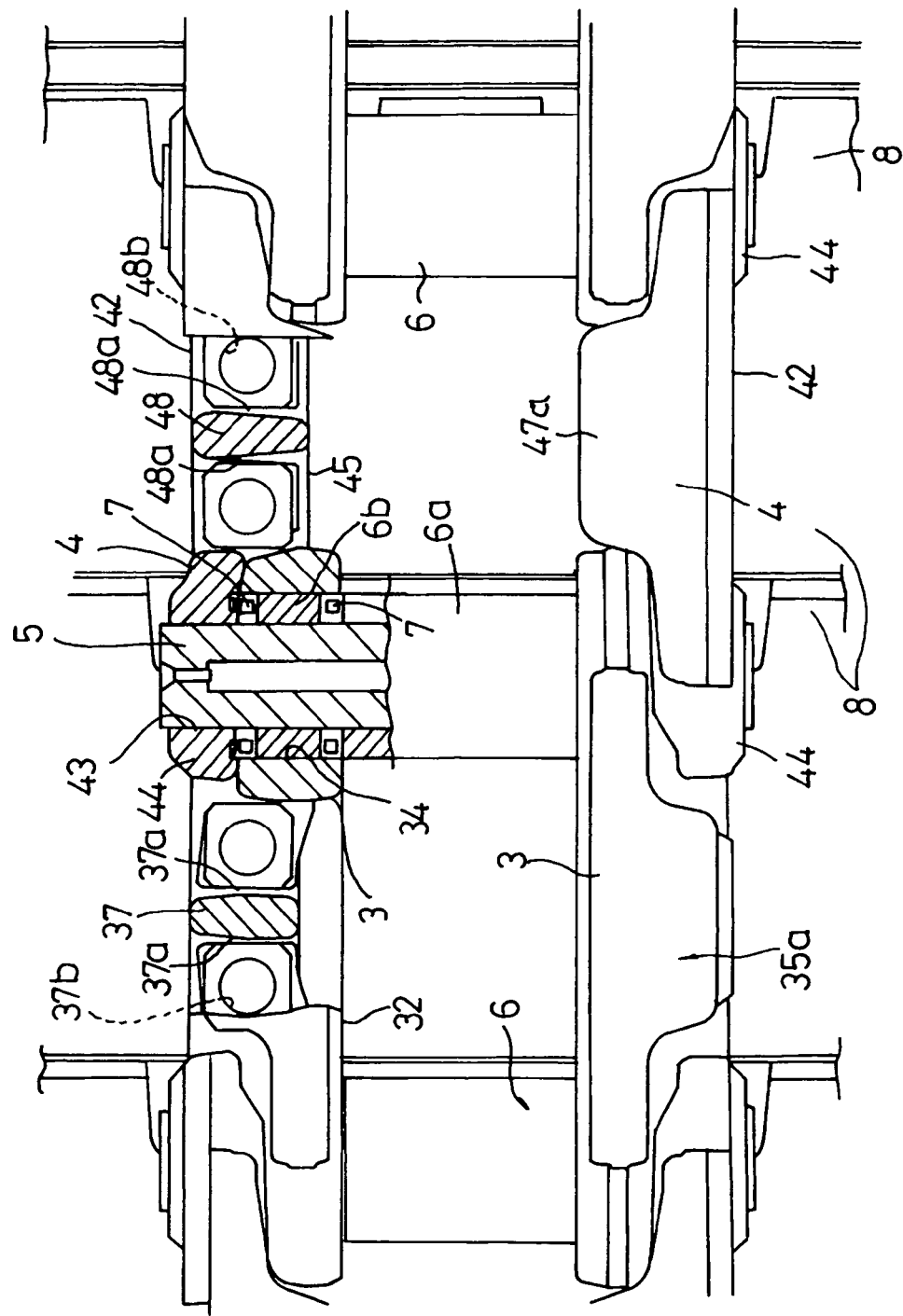
FIG. 3 is a top plan view showing, in cross section, a part of FIG. 2.
Figure 4:
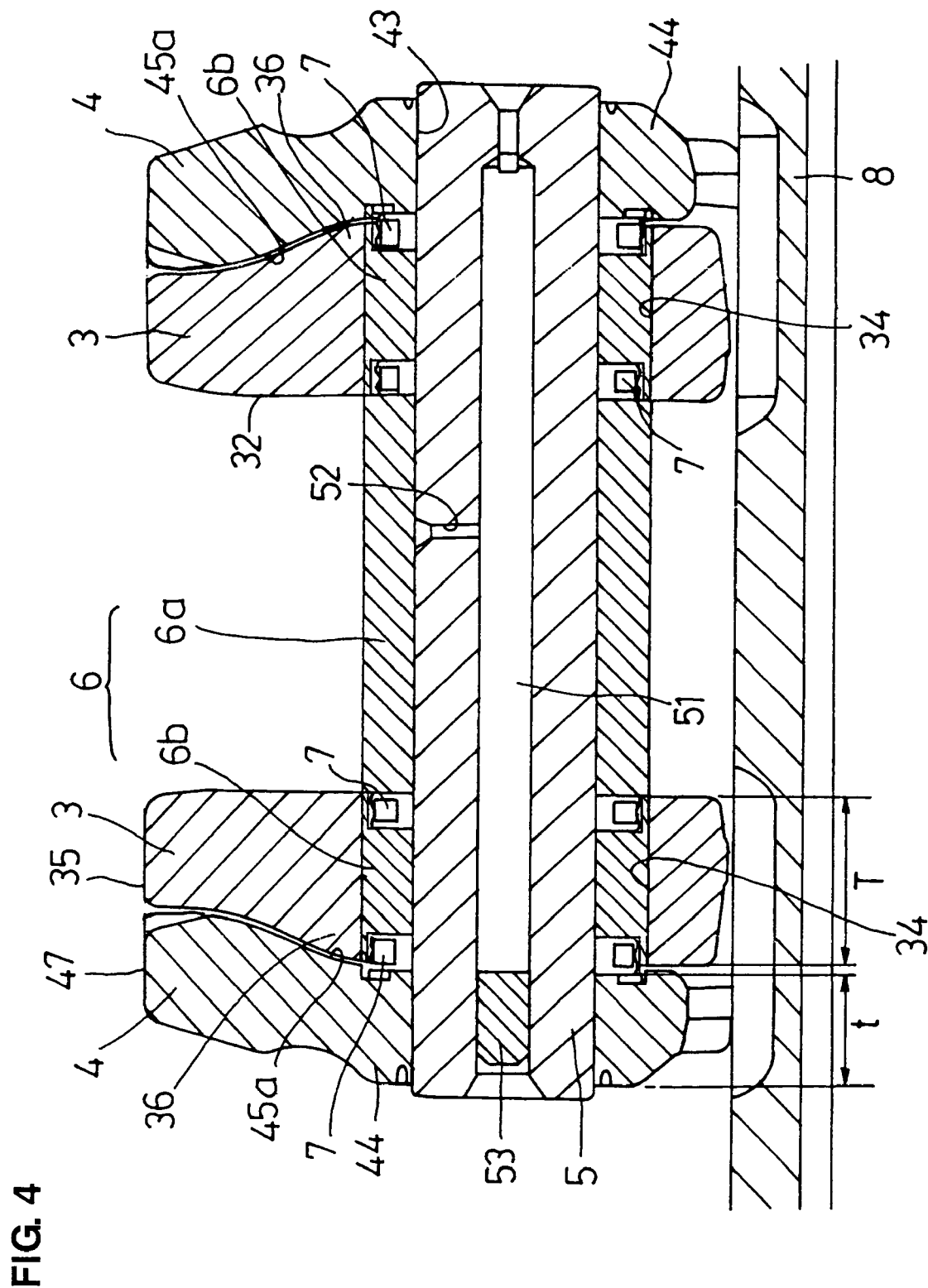
FIG. 4 is an enlarged cross sectional view taken on the line A-A of FIG. 2.
Figure 5:
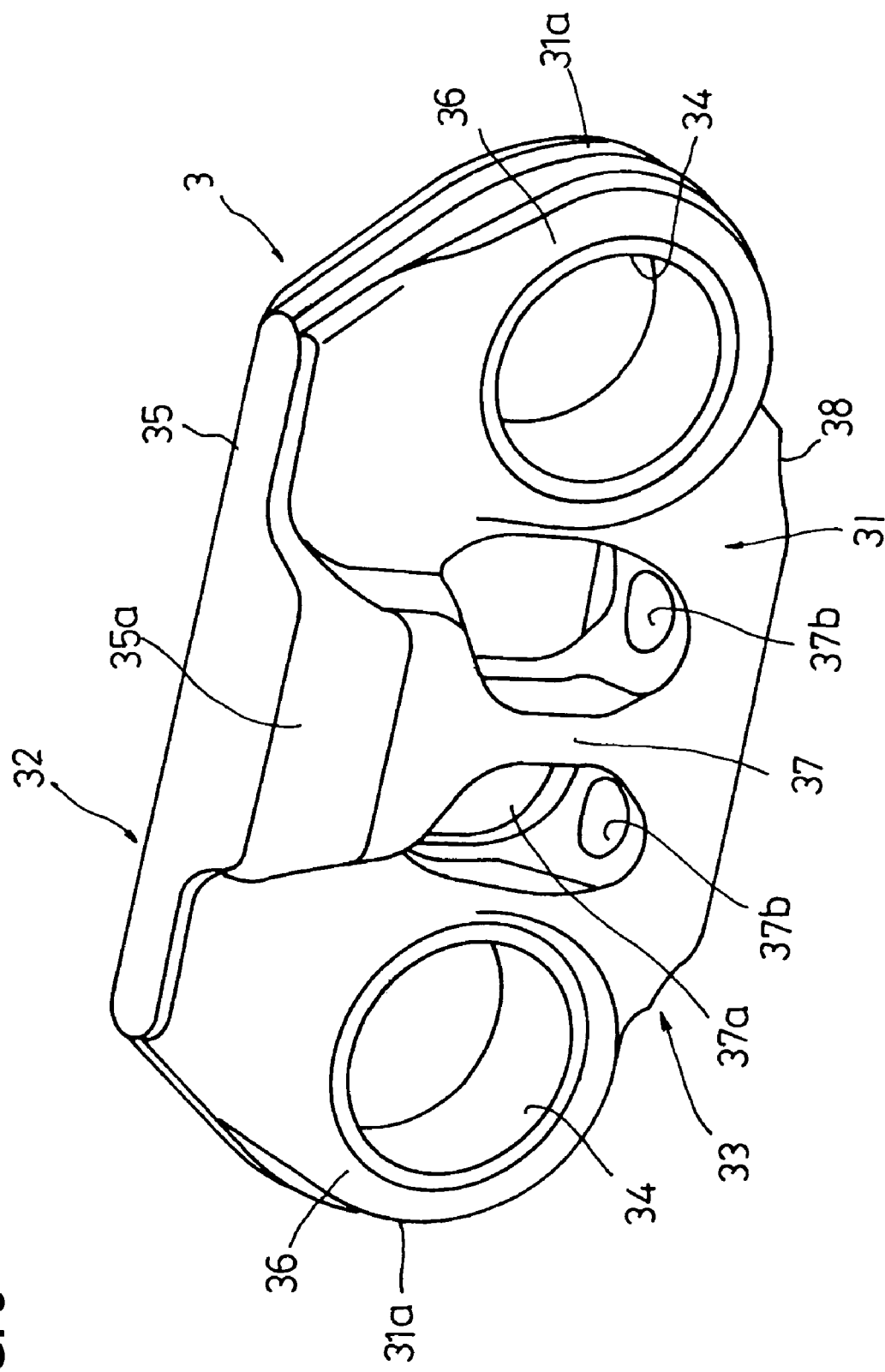
FIG. 5 is a perspective illustration of an internal link of the track of the embodiment.
Figure 6:
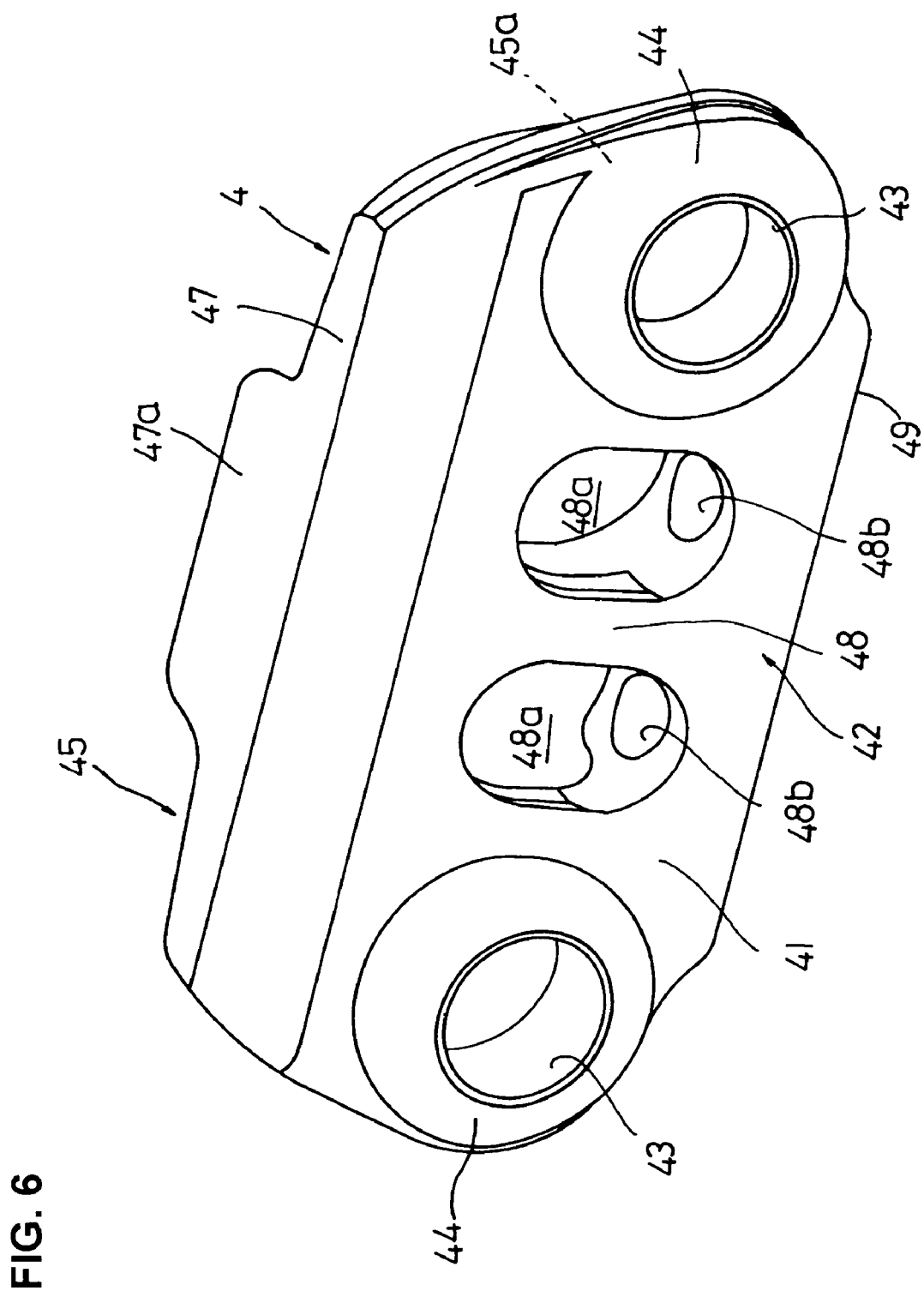
FIG. 6 is a perspective illustration of an external link of the present embodiment.
Figure 7:
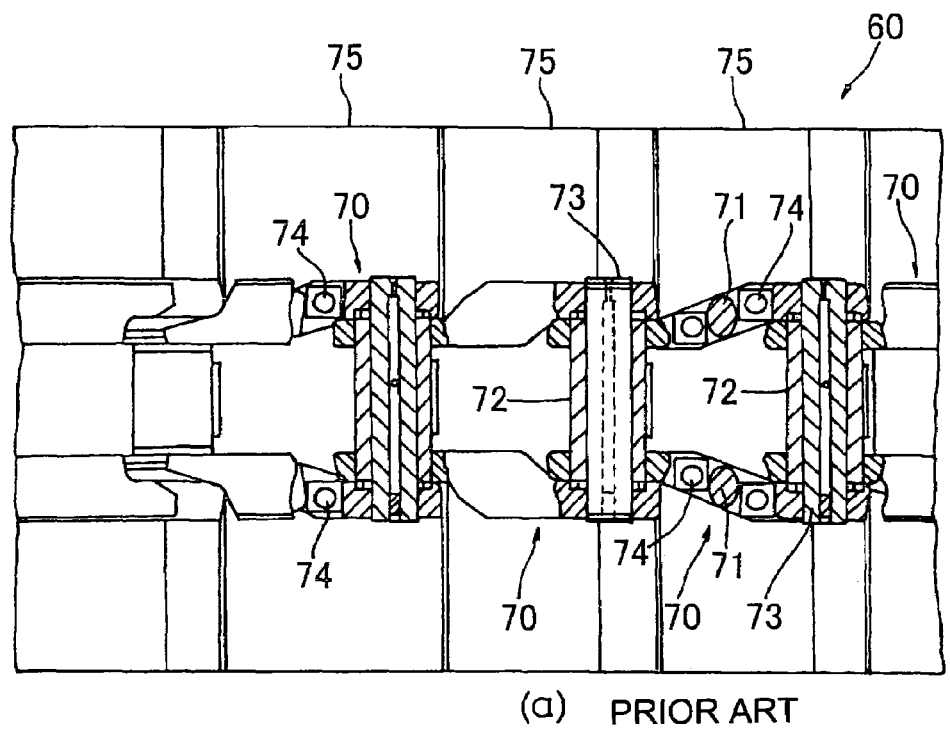
FIG. 7 is an illustrative diagram for providing a description of the arrangement of a track formed in accordance with a prior art technique.
Figure 7:
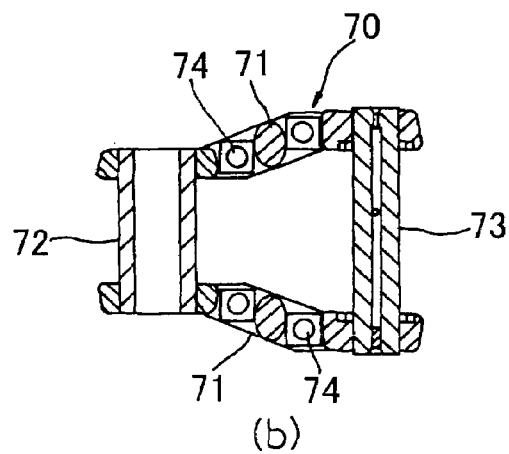

FIG. 1 is a partial perspective illustration of a track according to an embodiment of the present invention. FIG. 2 is a partial front view of the track. FIG. 3 is a top plan view showing, in cross section, a part of FIG. 2. FIG. 4 is an enlarged cross sectional view taken on the line A-A of FIG. 2. FIG. 5 is a perspective illustration of an internal link of the track. FIG. 6 is a perspective illustration of an external link of the track.

A track 1 with a rotatable bushing of the present embodiment is usually incorporated into an undercarriage (not shown) of a track-type construction machine (work machine) such as a hydraulic excavator, a bulldozer et cetera. As partially shown in FIG. 1, the track 1 with the rotatable bushing (hereinafter called the "track 1") comprises track links 2, wherein internal and external links 3, 4 are interlinked right and left relative to the width direction at required intervals and are assembled to respective track shoes 8 disposed on the ground contact surface side by means of bolt fastening. The internal and external links 3, 4 in large numbers are interlinked in an endless manner by the use of coupler pins 5 and bushings 6, and the track shoes 8 are mounted on the contact ground side of the links 3, 4.

The external and internal links 3, 4 are, as described above, symmetrically with the coupling direction axial line and are interlinked alternately, by the coupler pin 5 and the bushing 6 and each track link 2 of the track 1 is sequentially interconnected with the other. Since the internal and external links 3, 4 are symmetrical in shape, those situated on one side will be described hereinafter.

Firstly, the internal link 3 has a main body part 31, as best seen in FIG. 5. In the main body part 31, its inside surface 32 is formed into a flush flat surface, and the inside surface 32 is either an opposing surface to another internal link 3 (external link 4) situated on the opposite side when assembled as the track link 2 or a surface that travels along the track drive sprocket which is hereinafter called the "inside surface 32" while the opposite surface to the inside surface 32 is referred to as the "outside surface 33". In the main body part 31, a hole 34 (hereinafter the bushing hole 34) for the bushing 6 which is externally interfitted onto the coupler pin 5 at predetermined pitches is so formed as to extend orthogonally to the inside surface 32. Additionally, an upper surface of the internal link 3 serves as a tread, and a projecting part 35a, for securing the tread 35 at link assembly time, is projectingly provided in an upper half part of the internal link 3 situated between bushing holes 34, 34 so that it projects a required dimension from the outside surface 33. Furthermore, a pillar 37 is vertically provided under the projecting part 35a in the middle of the main body part 31. Through holes 37a, 37a are provided on each side of the pillar 37, passing completely through from one side to the other. A bolt insertion hole 37b is penetratingly formed at predetermined pitches so that it extends from a lower end surface (i.e., a track shoe mount surface 38). The track shoe mount surface in a parallel relationship with a plane connecting the centers of the bushing holes 34, 34, and the tread 35 is also formed into a flat surface running parallel with the track shoe mount surface 38. Each end 31a of the main body part 31 is shaped like a circular arc with a required radius on the basis of the axial core of the bushing hole 34. The whole main body part 31 is formed symmetrically with the central longitudinal axial line when viewed from the front.

As can be seen from FIG. 4, a boss part 36 forming a part of a frustum which gently slopes upward is provided on the side of the outside surface 33 of the bushing hole 34 in the internal link 3. The boss part 36 has an outer shape continuing smoothly to the tread 35. Therefore, in the present embodiment, the axial-wise length of the bushing hole 34(thickness T) is about 1.5 times the axial-wise length (thickness t) of a coupler pin press-fit hole (coupler pin hole 43) in the external link 4 which will be described later. On the other hand, the external link 4 has a main body part 41 the contour of which is almost the same as the aforesaid internal link 3, and has coupler pin holes 43, 43 the dimension of which is the same as the pitch of the bushing holes 34, 34 of the internal link 3, and an outside surface 42 of the external link 4 is made flat. The external link 4 is so shaped as to have a boss part 44 shaped like a frustum, whereby a circumferential area of the coupler pin hole's 43 formation part gently slopes upward. Additionally, in the inside surface 45 of the external link 4, the circumference of the coupler pin hole 43 is formed into a concave surface (i.e., a concavely curved surface 45a forming a concavity) corresponding to the shape of the boss part 36 of the outside surface 33 of the internal link 3. Additionally, as in the internal link 3, a projecting part 47a, for securing a tread 47 at link assembly time, is projectingly provided in an upper half part situated midway between the coupler pin holes 43, 43 so that it projects a required dimension from the inside surface 45. Furthermore, a pillar 48 is vertically provided under the projecting part 47a in the middle of the main body part 41. Through holes 48a, 48a are provided on each side of the pillar 48, passing completely through from one side to the other in the external link 4. A bolt insertion hole 48b is penetratingly provided at predetermined pitches so that it extends from a lower side of each through hole 48a in a direction orthogonal to a lower end surface (i.e., a track shoe mount surface 49).

The coupler pin 5, for the assembling of the track link 2 made up of the internal and external links 3, 4 alternately arranged, is passed through the inside of the bushing 6 interfitted to the bushing hole 34 of the internal link 3. Both ends of the coupler pin 5 are press fitted into the coupler pin holes 43 of the external links 4, 4 and the outer end thereof is caulked at an outer surface of the boss part 44 and is firmly fixed. The coupler pin 5 is provided with a lubricant filling hole 51 in the axial center thereof. Lubricant is filled and charged through one outer end of the lubricant filling hole 51 from the outside. Additionally, provided in the middle of the coupler pin 5 is a lubricant supply small hole 52 for a contact surface with a rotatable bushing 6a which will be described later, thereby making it possible to secure the lubricating property of the rotatable bushing 6a. Reference numeral 53 of FIG. 4 denotes a plug.

On the other hand, the bushing 6 to be interfitted onto the coupler pin 5 is divided into three sub-bushing portions, namely fixed bushings 6b, 6b interfitted into the inside of the bushing holes 34 of the internal link 3, and the aforesaid rotatable bushing 6a interposed between the right and left internal links 3, 3 and supported rotatably on the coupler pin 5.

Each fixed bushing 6b which is interfittingly mounted into the bushing hole 34 of the internal link 3 is so formed as to have a length dimension capable of securing, when tractional forces act thereon at the time of being assembled as the track link 2, a pressure receiving surface able to cope with the resulting load, and it is arranged such that seal rings 7, 7 are housed on both sides of the fixed bushing 6b. Therefore, as described above, the thickness T of the bushing holes 34 formation part is made greater than the thickness t of the coupler pin hole's 43 formation part of the external link 4. In comparison with the thickness dimension t of the coupler pin holes 43 formation part of the external link 4, the thickness dimension T of the bushing holes 34 formation part may be set such that the internal link's 3 side (bushing hole formation part) thickness is about 1.1 times at minimum (preferably about 1.3 times) that of the external link's 4 side thickness, in which case one of the seal rings 7 is disposed on the coupler pin fixing side as conventionally. Additionally, for the purpose of further enhancing strength, the thickness dimension T of the bushing holes 34 formation part can be increased to about two times the thickness dimension t of the coupler pin holes 43 of the external link 4. However, if the thickness dimension T is made greater to a further extent, this increases the width dimension of the track link 2, as a result of which the width dimension of tracker rollers must be increased. The underbody size increases, which is economically inefficient. In view of this, the ratio of the thickness dimension T to the thickness dimension t, i.e., T/t, is set to 1.5 in the present embodiment. Additionally, if the T/t ratio is set to 1.4, this produces economical advantages.

As described above, in manufacture of the internal and external links 3, 4 of the present embodiment, their outer shape is formed by mold forgoing. Because of the arrangement that the boss part 36 provided around the bushing hole 34, each of which becomes a substantial part in the main body part, are formed into a gently bulging-out, or protruded or raised shape, workability in the molding process becomes favorable, and the substantial parts can be formed thick without trouble. Each of the coupler pin hole 43, the bushing hole 34, and the bolt insertion holes 37b, 48b provided through the track shoe mount surfaces 38, 49 is machined.

The track 1 with the rotatable bushing of the present embodiment constructed in the above-described way is assembled as follow. That is, the internal and external links 3, 4 are sequentially interconnected by interfitting of the coupler pins 5 to the associated bushings 6, and the track shoes 8 are fastened to the track shoe mount surfaces 38, 49 of the internal and external links 3, 4 by the bolts 10 and the nuts 11 through the bolt insertion holes 37b, 48b. The track 1 thus assembled is wound around the sprocket and the idler of the vehicle body.

The track 1 with the rotatable bushing of the present embodiment is constructed as follows. That is, in the internal link 3, in order to provide a structure required for supporting the bushing 6, the relevant portion (i.e., the boss part 36) is formed thick. On the other hand, in the external link 4, the concavely curved surface 45a corresponding to the shape of the boss part 36 forming the bushing hole 34 of the internal link 3 provides a structure required for mounting the coupler pin 5. Such a combination of the internal and external links 3, 4 is fastened to the track shoe 8, thereby providing a structure totally balanced in terms of the strength. Therefore, it becomes possible to rationally solve the strength problems with the prior art techniques. Besides, the arrangement that the seal rings 7 are housed together on the side of the internal link 3 in the bushing mounting part makes it possible to improve assembly, and, in addition, it is ensured that entrance of powder dust into the inside of the fixed bushings 6b is prevented without fail. Therefore, bearing functions are performed in smooth manner, thereby making it possible to achieve improvement in the durability.

What is claimed is:

1. A track for use in a track-type vehicle comprising:
   a track link having an alternate combination of external links and internal links, said external links and said internal links being interlinked right and left relative to a width direction of a track, said internal link being formed symmetrically with respect to the central longitudinal axial line when viewed from the front;
   a coupler pin interlinking said external link and internal link,
   a rotatable bushing being interposed between the right and left internal links, said rotatable bushing being supported rotatably on said coupler pin;
   a coupler pin hole being provided through said external link, an end of said coupler pin being press fitted into said coupler pin hole;
   a bushing hole being provided through said internal link; and
   a fixed bushing, an outermost circumference of which being interfitted completely inside of said bushing hole;
   wherein said bushing hole of said internal link being formed greater in thickness as viewed in the width direction than said coupler pin hole of said external link and having a uniform cylindrical structure.

2. The track as set forth in claim 1, wherein a boss part having a raised portion around said bushing hole is provided on an outer surface area of said internal link.

3. The track as set forth in claim 2, wherein an inner surface side circumferential area of said coupler pin hole of said external link is formed into a concave surface corresponding to an outer shape of said boss part of said internal link.

4. The track as set forth in claim 3, wherein an outer surface side circumferential area of said coupler pin hole of said external link is formed into a raised shape.

5. A track for use in a track-type vehicle comprising:
   a track link having a combination of external links and internal links, said external links and said internal links being interlinked right and left relative to a width direction of a track,
   a coupler pin interlinking said external link and internal link,
   a rotatable bushing being interposed between the right and left internal links, said rotatable bushing being supported rotatably on said coupler pin;
   a coupler pin hole being provided through said external link, an end of said coupler pin being press fitted into said coupler pin hole;
   a bushing hole being provided through said internal link; and
   a fixed bushing being interfitted into the inside of said bushing hole;
   wherein said bushing hole part of said internal link is 1.1 to 1.5 times greater in thickness as viewed in the width direction than said coupler pin hole part of said external link.

6. The track as set forth in claim 1, wherein a seal ring, interposed between a fixed bushing which is interfittingly inserted into said bushing hole of said internal link and a rotatable bushing which is interposed between right and left internal links, is interfittingly disposed in the inside of said bushing hole.

7. The track as set forth in claim 1, wherein a seal ring, interposed between a fixed bushing which is interfittingly inserted into said bushing hole of said internal link and said external link, is interfittingly disposed in the inside of said bushing hole.

8. A track for use in a track-type vehicle, comprising:
   a track link having an alternate combination of external links and internal links, said external links and said internal links being interlinked right and left relative to a width direction of a track, said internal link being formed symmetrically with respect to the central longitudinal axial line when viewed from the front;
   a coupler pin interlinking said external link and internal link;
   a bushing including a pair of fixed bushing portions and a rotatable bushing portion disposed axially between the pair of fixed bushing portions, the rotatable bushing portion being interposed between the right and left internal links, said rotatable bushing portion being supported rotatably on said coupler pin;
   a coupler pin hole being provided through said external link, an end of said coupler pin being press fitted into said coupler pin hole;
   a bushing hole being provided through said internal link; and
   an inner pair of sealing rings and an outer pair of sealing rings,
   wherein a respective one of the pair of fixed bushing portions, a respective one of the pair of inner sealing rings and a respective one of the pair of outer sealing rings being completely disposed in the bushing hole of a respective one of the right and left internal links, the respective one of the pair of fixed bushing portions disposed between respective ones of the inner and outer sealing rings and being fixedly connected to a respective one of the right and left internal links inside the bushing hole,
   wherein each one of the internal links having a flat inside internal link surface and an opposite outside internal link surface with an internal link boss part projecting from the outside internal link surface and surrounding the bushing hole,
   wherein each one the external links having an inside external link surface and an outside external link surface, the inside external link surface having a concavely curved surface portion corresponding to and sized for receiving the internal link boss part, the external link boss part projecting from the outside external link surface and surrounding the coupler pin hole,
   wherein the rotatable bushing portion being axially disposed between the pair of inner sealing rings with respective ones of the inner sealing rings being disposed between respective ones of the fixed bushing portions and the rotatable bushing portion, and
   wherein said bushing hole of said internal link being formed greater in thickness as viewed in the width direction than said coupler pin hole of said external link.

9. A track according to claim 8, wherein said bushing hole of said internal link is 1.1 to 1.5 times greater in thickness as viewed in the width direction than said coupler pin hole of said external link.

* * * * *